United States Patent [19]

Uke

[11] Patent Number: 5,103,381
[45] Date of Patent: Apr. 7, 1992

[54] LAMP REFLECTOR SYSTEM

[76] Inventor: Alan K. Uke, P.O. Box 8531, Rancho Santa Fe, Calif. 92067

[21] Appl. No.: 639,571

[22] Filed: Jan. 9, 1991

[51] Int. Cl.⁵ .............................................. F21V 7/04
[52] U.S. Cl. ...................................... 362/32; 362/208; 362/305; 362/343
[58] Field of Search ................. 362/32, 208, 305, 343, 362/307, 255, 256, 346, 308

[56] References Cited

U.S. PATENT DOCUMENTS 4,460,939 7/1984 Murakami et al. ............... 362/32 X
4,631,642 12/1986 Brun ........................................ 362/32

Primary Examiner—Stephen F. Husar
Attorney, Agent, or Firm—Brown, Martin, Haller & McClain

[57] ABSTRACT

A reflector system for a flashlight or the like includes a rear reflector of at least partially parabolic shape and a light source mounted at the focus of the parabolic reflector surface. A lens is mounted between the light source and the open forward end of the reflector to occlude any light beams which would otherwise travel uninterrupted from the light source out of the open forward end of the reflector. The rear reflector may include a spherical surface portion at its center for intensifying the light source, and a collimating pillar of transparent material extends inwardly from the center of the forward end of the reflector towards the lens for collecting light re-directed by the lens, and mixing and breaking up any image forming rays.

11 Claims, 3 Drawing Sheets

LAMP REFLECTOR SYSTEM

BACKGROUND OF THE INVENTION

The present invention relates generally to an optical reflector system for a lamp, designed to create a uniform, high intensity beam of light suitable for use as an automobile headlight, a flashlight, or the like.

Existing flashlights or headlights include a suitable light source such as a filament light bulb or gas discharge lamp located at the focus of a parabolic rear reflector for directing light beams emitted from the source forwardly through a suitable window at the front end of the flashlight or headlight. One problem with such devices is that the light source is not a true point, but is in fact an elongated line-type source, so that the emitted light is not all directed in a parallel, cylindrical beam of light in the desired illumination direction. Also some wide angle rays radiate outwardly to the side of the device, reducing the effective beam intensity and causing undesirable glare. In some cases, such as underwater use or use in foggy conditions, wide angle side scattered light can cause back scattering into the eyes of the user, significantly reducing visibility.

Some attempts have been made in the past to reduce these problems. For example, in U.S. Pat. No. 3,796,886 of Freeman describes a sealed beam lamp in which a light source is located at the focus of a first rear reflector of parabolic shape, and a second rear reflector of elliptical shape also has a focal point coincident with the light source. A spherical front reflector has an origin at the light source and an aperture located at the second focal point of the elliptical reflector. A plano-convex lens is located at the center of the front window of the lamp. The front reflector is positioned to intercept all diverging light rays originating from the source which would otherwise pass through the front opening of the parabolic reflector without reflection. The intercepted rays are directed back to the elliptical reflector, where they are reflected back again through the aperture of the front reflector, and focused by the lens.

SUMMARY OF THE INVENTION

It is an object of the present invention to provide a new and improved optical reflector system for producing a high intensity beam of light.

According to one aspect of the present invention, a reflector system for a flashlight or the like is provided which comprises a rear reflector of substantially paraboloidal shape across at least the majority of its surface, a light source located at the focus of the rear reflector, the rear reflector having an opening at its forward end, and a lens device supported between the light source and the forward opening of the rear reflector with its focal point approximately centered on the light source, the lens device being arranged to intercept direct light rays from the source which would otherwise pass directly through the front opening in a divergent path, and to re-direct those light rays in less divergent or parallel paths through the central area of the front opening.

The lens may be a conventional or Fresnel type lens, and may be a plano or double convex lens for re-directing intercepted light beams in a substantially parallel path. In one embodiment of the invention, a collimating pillar of glass or transparent plastic having a diameter substantially equal to the diameter of the light source and an aperture equal to that of the lens extends from the lens to the front opening of the rear reflector, which is suitably covered by a window of a material transparent to the light rays emitted by the source. The cylindrical outer surface of the pillar acts to reflect light beams back and forth inside the pillar until they emerge from its forward end as a substantially uniform, conical beam of light. This arrangement avoids formation of an image of the light source which would otherwise be formed by the lens. The collimating pillar allows total internal reflection of the light entering the column, mixing the light rays which would otherwise produce an image of the light source or filament, producing a relatively even cone of emitted light rays at the center of the emitted beam, which is also parallel and concentric with the beam emitted by the reflector.

The lens device may be formed at the inner end of the collimating pillar itself, or may be separate from the pillar and formed, for example, on the end of the lamp or light source. In the latter case, the pillar will have a flat end.

In one embodiment of the invention, the rear reflector has an integrally formed, part-spherical reflective surface at its center which is centered on the light source. The spherical surface has an aperture which is the same as that of the lens device, and the same as that of the pillar where the collimating pillar is present. The spherical surface acts to concentrate the light back radially towards the source, where it either passes through or is re-absorbed and heats the filament in the case of a filament type light source, reducing energy losses.

Any of the lens or reflector surfaces may be made wavy or curvy so as to break up any image forming light rays, producing a more uniform, evenly distributed output beam. The light source may be a gas discharge or filament type bulb, and may be mounted in a vertical or horizontal orientation.

This arrangement reduces energy losses and undesirable back scattering of divergent light rays which would otherwise be emitted without reflection from the device, and provides improved intensity in a flashlight reflector system.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which.

DESCRIPTION OF THE PREFERRED EMBODIMENTS

Figure 1:
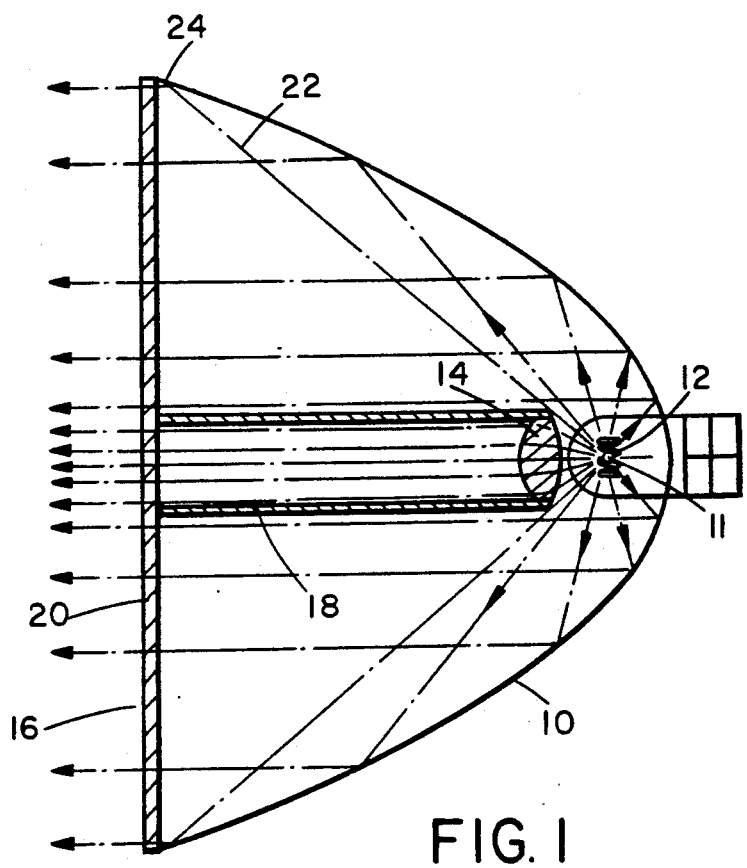
FIG. 1 is a vertical cross-sectional view of an optical reflector system for a flashlight or the like according to a first embodiment of the invention.

FIG. 1 of the drawings illustrates an optical reflector system according to a first embodiment of the present invention for use in a flashlight, automobile headlight or the like. It will be understood that the system will be installed in a suitable housing, which may be sealed or unsealed dependent on the application, as is known in the lighting industry.

The system of FIGURE basically comprises a rear reflector 10 of generally paraboloidal shape with a suitable light source 12, which may be a filament bulb as illustrated or a gas discharge lamp, located at the focus 11 of the reflector 10. Reflector 10 may be a true parabola as illustrated or may be of alternative, generally paraboloidal shapes. A lens 14 is supported within the reflector between the light source 12 and the front opening 16 of the reflector 10 by any suitable support mechanism, such as a spider frame arrangement, for example. Alternatively, the lens 14 may be mounted at the end of a hollow tube 18 which is secured at its opposite end to a transparent front plate or window 20 secured across the front opening of the reflector, as illustrated in FIG. 1.

The lens is positioned with its focal point at or close to the light source 12, and has an aperture sufficient to occlude the reflector at the front, intercepting any divergent light rays from the source which would otherwise pass uninterrupted through the front opening of the device. In other words, the relative dimensions and positioning of the lens and reflector surface are such that the outer peripheral edge of the lens coincides with a light ray 22 drawn from the source to the outer edge 24 of the reflector. The lens 14 may be a plano-convex lens as illustrated, or may be a double convex lens. It may be a conventional or Fresnel-type lens. Preferably, the surfaces of the lens are textured to form a slightly wavy or curvy surface which tends to break up the image of the filament which would otherwise be formed by the lens.

In this embodiment the lens 14 is completely separate from both the light source and the front window of the system, allowing it to be optically aligned with the source and positioned accurately for improved results. This arrangement avoids or reduces the amount of light directed in diverging paths away from the beam, reducing back scattering and other undesirable effects, and improving efficiency.

Figure 2:
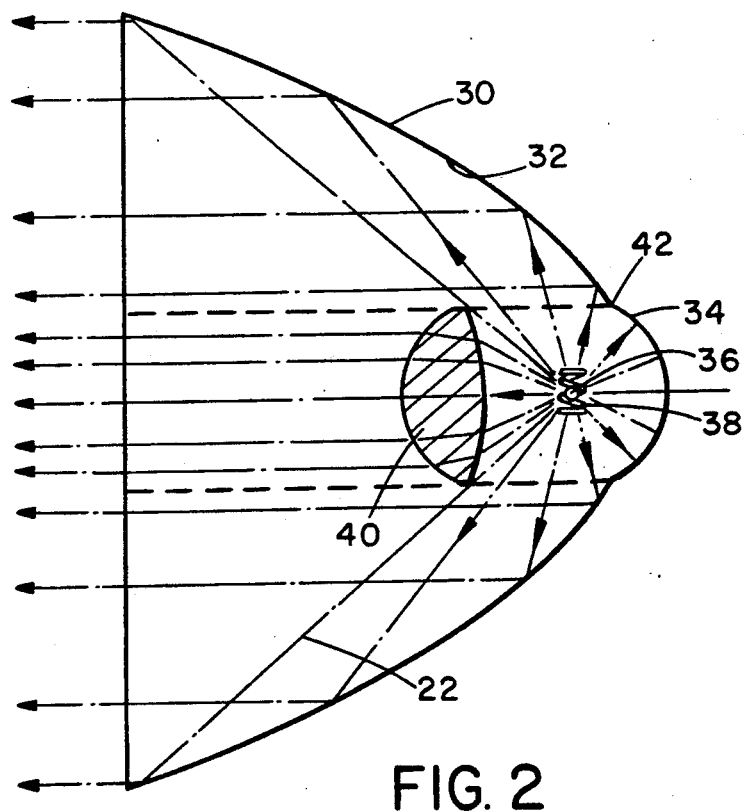
FIGS. 2 to 5 are vertical cross-sectional views similar to FIG. 1 showing several alternative embodiments of the invention.

FIG. 2 of the drawings illustrates a modified embodiment of the invention which is similar to FIG. 1 but in which the parabolic rear reflector is replaced with a rear reflector 30 which has a first, parabolic reflector surface 32 having an integral, spherical reflective surface 34 formed integrally at its center. Although the parabolic and spherical surfaces are formed in an integral reflective surface in FIG. 2, it will be understood that they may alternatively be formed separately with the spherical surface suitably mounted at the rear of the area enclosed by the parabolic surface. The center of the spherical reflective surface 34 coincides with the focal point 36 of the parabolic surface, and the light source 38 is mounted at this point via a suitable, standard flashlight mounting (not illustrated). As in the previous embodiment, a lens 40 is supported in front of the light source to occlude wide angle light rays which would otherwise pass uninterrupted through the front opening of the reflector 30, with the lens being positioned with its focal point at or close to the light source, and having an aperture equal to the divergent beam diameter of beam 22 at the position of the lens. The transition 42 from the spherical to the parabolic reflective surface occurs at a point corresponding to the diameter of lens 40, as illustrated, and the lens and spherical reflective surface are arranged concentrically.

As in the previous embodiment, the lens 40 intercepts light rays directed forwardly from the source which would otherwise pass uninterrupted through the front opening or window of the reflector, and re-directs them in substantially parallel paths through the front of the reflector to produce a more intense beam. Additionally, the spherical reflector surface will re-direct light rays emitted rearwardly from the source radially back towards the source, where they will either pass through or heat the filament and be re-absorbed, increasing the light intensity and reducing energy losses. If the lens 40 is positioned so that its focal point is not exactly centered on the light source, the tendency for the lens to produce an image of the filament or discharge tube will be reduced. This image formation can also be prevented by suitable texturing or roughening the lens surfaces to break up the image, as in the first embodiment.

Figure 3:
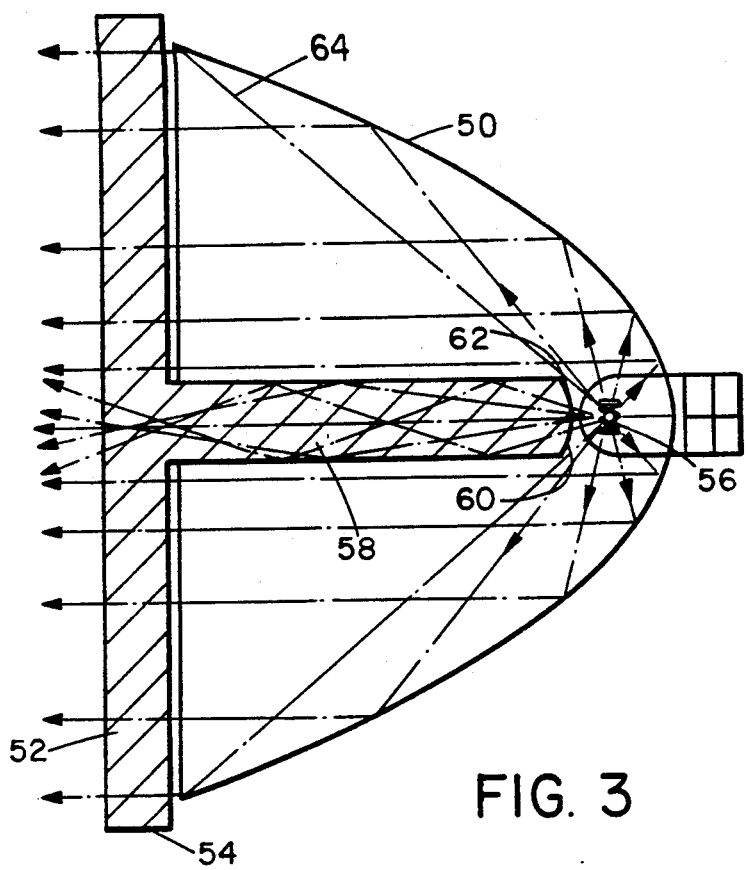

FIG. 3 illustrates an optical system for a flashlight or the like according to another embodiment of the invention. In this embodiment, a rear reflector 50 of generally paraboloidal shape has an optional front cover or window 52 of transparent material extending over its front opening 54, and a suitable light source 56 is mounted in a standard fashion at the focus of the parabolic surface. A solid, cylindrical collimating pillar 58 of transparent material such as glass or plastic extends from a position in front of the source 56 up to the front cover 52, to which it is suitably mounted. The innermost end face 60 of the pillar 58 is formed into a convex lens surface, focussed at or close to the light source, and is arranged to occlude wide angle divergent light rays emerging from the source which would otherwise pass uninterrupted through the front opening of the reflector, causing unwanted energy losses and back reflections. Thus, as in the previous embodiments, the outer peripheral edge 62 of the lens surface at the end of the pillar is coincident with a divergent light ray 64 extending from the source to the outermost edge of the reflector 50.

With this arrangement, the lens surface 60 occludes the reflector to concentrate the light into a beam and avoid back scattering. The pillar behind the lens surface allows for total internal reflection of all the light entering the pillar. This light will be at a relatively small angle and will therefore be internally reflected as illustrated in FIG. 3 and emitted as a cone of light at the front of the device. This arrangement allows for the fact that the light source is not a true point source but has some length. Any off center light emissions will not be directed in a true parallel path by the lens 60, and will tend to produce an image of the light source or filament. However, the collimating pillar prevents loss of these emissions by internally reflecting them back and forth inside the pillar, mixing the beams and producing a relatively even output cone of light centered at the emitted beam. The collimating pillar therefore tends to mix up the light beams which would otherwise produce an image of the filament, and produces a more uniform output. If necessary, the outer cylindrical surface of the pillar may have a coating of a material having a different refractive index or may be metallized, but in practice it is believed that the beam angles encountered will be small enough to produce total internal reflection without requiring such coatings.

As in the previous embodiments, the lens surface may be roughened or texturized to produce more mixing of the light rays, and to correct for any cocking or misalignment of the light source, and it may be a conventional or Fresnel-type lens surface.

Figure 4:
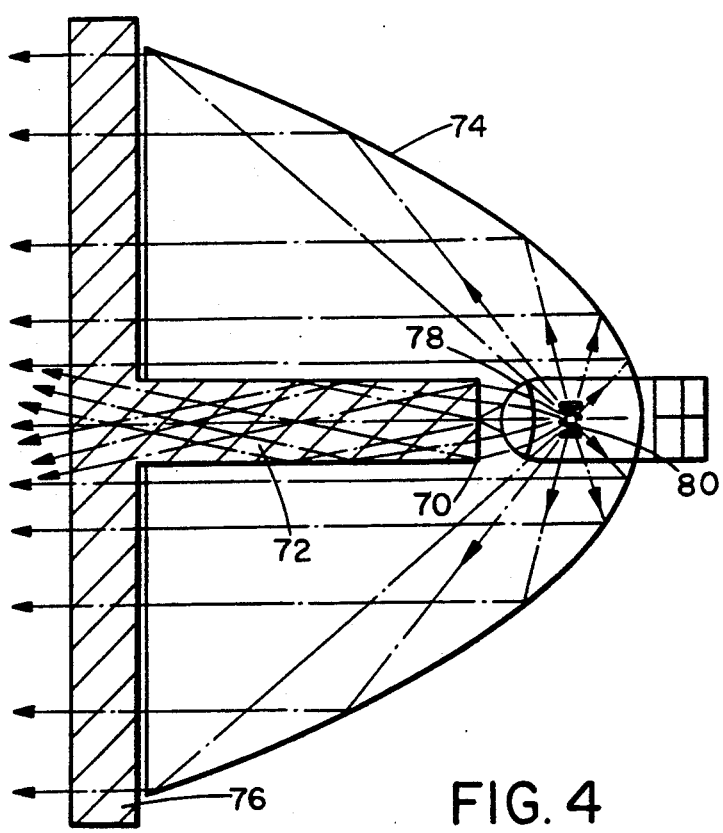

FIG. 4 illustrates a modified embodiment of the invention which is similar to that of FIG. 3 except that the end 70 of collimating pillar 72 is flat. As in the previous embodiment, the rear reflector 74 is parabolic and the cylindrical pillar 72 extends inwardly from a front cover or window 76 covering the front opening of reflector 74. In this embodiment, a lens 78 is mounted on the end of light source 80 and is designed to occlude divergent light rays emitted from the source as in all the previous embodiments, while the pillar 72 will intercept light rays re-directed by the lens, reflecting these rays back and forth and mixing them up to break up the filament image and produce a more even output beam intensity. Again, the surfaces of the lens and end of the pillar may be roughened or textured to produce even more breaking up of any potential image forming rays.

Figure 5:
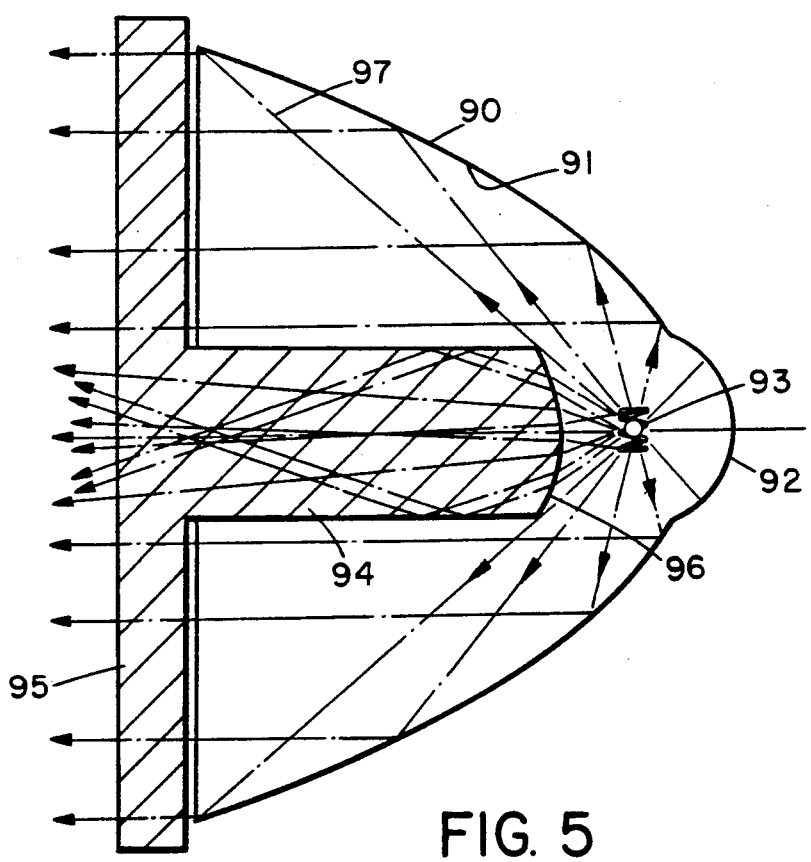

FIG. 5 illustrates another embodiment of the invention which is similar to FIG. 3 but has a rear reflector 90 having integrally formed parabolic and spherical surfaces 91,92, respectively, similar to that of FIG. 2. A light source 93 is located at the focus of parabolic surface 91 and the center of spherical surface 92, and a collimating pillar 94 of transparent material extends from a front cover or window 95 of the device inwardly towards the light source. As in the embodiment of FIG. 3, a lens surface 96 is formed at the inner end of pillar 94, with its focus at or close to light source 93, and its outer periphery lying on a light ray 97 extending from the source to the outer peripheral edge of the reflector 90, so that the lens will occlude the reflector and intercept and re-direct any light rays which would otherwise be emitted directly out of the front of the device. As in the embodiment of FIG. 2, the spherical reflective source re-directs rearwardly directed light back to the source, increasing its intensity and reducing losses. The cylindrical collimating pillar will internally reflect the collected light back and forth inside the length of the pillar to emit a substantially uniform, small angle cone of light at its forward end. This will tend to break up the image which would otherwise be formed by the lens. The lens surface may be of a conventional or Fresnel type, and it may be roughened or textured to produce further breaking up of the image.

The optical reflector system of this invention provides a relatively simple and inexpensive device for producing a high efficiency light beam for a flashlight, automobile headlight or the like, substantially reducing energy losses and unwanted back reflections, and producing a more uniform and even light beam.

Although some preferred embodiments of the invention have been described above by way of example only, it will be understood by those skilled in the field that modifications may be made to the disclosed embodiments without departing from the scope of the invention, which is defined by the appended claims.

I claim:

1. An optical reflector system for a flashlight or the like, comprising:
    a rear reflector of generally parabolic shape having an open forward end;
    a light source located at the focus of the rear reflector; and
    a lens mounted between the light source and the open forward end of the reflector with its focus approximately centered on the light source, the lens having a predetermined diameter for intercepting any light rays which would otherwise be directed uninterrupted from the source through the open forward end of the reflector.

2. The system as claimed in claim 1, wherein the rear reflector includes a first, parabolic reflector surface and a second, spherical reflector surface formed integrally with the first surface at the center of the reflector, the second reflector surface having an aperture substantially equal to the lens diameter.

3. The system as claimed in claim 1, including a cylindrical collimating pillar of transparent material extending from the open forward end of the reflector towards the light source.

4. The system as claimed in claim 3, wherein a window of transparent material is mounted across the open forward end of the reflector, and the pillar extends from the center of said window.

5. The system as claimed in claim 3, wherein said lens comprises a lens surface formed on the inner end of said collimating pillar.

6. The system as claimed in claim 3, wherein light source comprises a lamp having an internal filament, and said lens is mounted integrally on the end of said lamp, said collimating pillar having a flat inner face adjacent said lens.

7. The system as claimed in claim 1, wherein the surface of said lens is textured.

8. An optical reflector system for a flashlight or the like, comprising:
    a rear reflector of generally parabolic shape having an open forward end;
    a light source located at the focus of the rear reflector;
    a solid collimating pillar of transparent material secured at one end at the center of the forward end of the rear reflector and extending rearwardly towards the light source, the opposite inner end of the pillar being spaced from the light source; and
    lens means between said light source and pillar for directing light rays, directed forwardly from the source in a predetermined range of angles, into the pillar;

9. The system as claimed in claim 8, wherein said lens means is formed on said inner end of the pillar.

10. The system as claimed in claim 8, including an outer housing for said light source, said lens means being mounted on an end of said housing facing said pillar.

11. An optical reflector system for a flashlight or the like, comprising:
    a rear reflector having a forward open end, a first reflective surface of a shape forming at least part of a parabaloid extending rearwardly from the forward open end to a transition position, and a second, spherical reflective surface extending from the transition position to the rear end of the reflector, the first and second reflective surfaces having a common focal point;
    a light source located at the focal point of said reflective surfaces; and
    a lens mounted between the light source and the open forward end of the reflector having a diameter substantially equal to the diameter of said spherical reflective surface.

* * * * *